(12) United States Patent
Klum (10) Patent No.: US 9,767,306 B2
(45) Date of Patent: Sep. 19, 2017

(54) SECURED DATA STORAGE ON A HARD DRIVE

(71) Applicant: Secured2 Corporation, Minneapolis, MN (US)

(72) Inventor: R. Daren Klum, Shoreview, MN (US)

(73) Assignee: Secured2 Corporation, Minneapolis, MN (US)

( * ) Notice: Subject to any disclaimer, the term of this patent is extended or adjusted under 35 U.S.C. 154(b) by 26 days.

(21) Appl. No.: 14/858,277

(22) Filed: Sep. 18, 2015

(65) Prior Publication Data

US 2016/0125196 A1  May 5, 2016

Related U.S. Application Data

(60) Provisional application No. 62/074,241, filed on Nov. 3, 2014.

(51) Int. Cl.
*G06F 12/14* (2006.01)
*H04L 29/06* (2006.01)
(Continued)

(52) U.S. Cl.
CPC .......... *G06F 21/6218* (2013.01); *G06F 21/32* (2013.01); *G06F 21/79* (2013.01);
(Continued)

(58) Field of Classification Search
CPC ...... G06F 21/6218; G06F 21/80; G06F 21/79; G06F 21/32; G06F 2221/2143; G06F 2221/2107
(Continued)

(56) References Cited

U.S. PATENT DOCUMENTS 6,415,373 B1 *  7/2002  Peters ................. G06F 11/1076
                                                    348/E5.008
6,487,081 B2   11/2002  Homer et al.
(Continued)

FOREIGN PATENT DOCUMENTS

WO     2007127188     11/2007

OTHER PUBLICATIONS

International Search Report and Written Opinion for PCT/US2015/050899, dated Jun. 29, 2016, 12 pages.

*Primary Examiner* — Aravind Moorthy
(74) *Attorney, Agent, or Firm* — Hamre, Schumann, Mueller & Larson, P.C.

(57) ABSTRACT

Secured electronic data storage on a hard drive is described. A computer system that incorporates the hard drive includes a shrink, shred, and data randomization algorithm built into the read/write function of the computer system for the purposes of securing any data that is stored on the hard drive. Data to be stored on the hard drive is processed using the algorithm which shrinks, shreds, and randomly distributes the data into multiple storage locations, for example multiple partitions of storage, different data storage drives of the hard drive, different folders of a storage device, and the like. An electronic log of where the data is distributed is kept in electronic data storage, on the computer system and/or separate from the computer system, that allows the data on the hard drive to be retrieved, reassembled, decompressed, and if necessary decrypted, upon receipt of a read/access request.

23 Claims, 7 Drawing Sheets

(51) Int. Cl.
  *G06F 7/04*      (2006.01)
  *G06F 13/28*     (2006.01)
  *G06F 21/62*     (2013.01)
  *G06F 21/32*     (2013.01)
  *G06F 21/79*     (2013.01)
  *G06F 21/80*     (2013.01)

(52) U.S. Cl.
  CPC ...... *G06F 21/80* (2013.01); *G06F 2221/2107* (2013.01); *G06F 2221/2143* (2013.01)

(58) Field of Classification Search
  USPC ..... 726/28, 26; 713/165, 193; 711/100, 170, 711/171, 173
  See application file for complete search history.

(56) References Cited

U.S. PATENT DOCUMENTS

| | | | |
|---|---|---|---|
| 2003/0028765 A1* | 2/2003 | Cromer | G06F 21/80 713/164 |
| 2003/0188153 A1* | 10/2003 | Demoff | G06F 11/2069 713/153 |
| 2003/0208693 A1 | 11/2003 | Yoshida | |
| 2004/0003272 A1 | 1/2004 | Bantz et al. | |
| 2004/0049700 A1 | 3/2004 | Yoshida | |
| 2006/0294331 A1* | 12/2006 | Forrer, Jr. | G06F 12/1466 711/163 |
| 2007/0136200 A1 | 6/2007 | Frank et al. | |
| 2007/0268611 A1* | 11/2007 | Buch | G11B 5/02 360/75 |
| 2008/0294911 A1 | 11/2008 | Nguyen et al. | |
| 2009/0254572 A1 | 10/2009 | Redlich | |
| 2009/0327751 A1 | 12/2009 | Koifman | |
| 2010/0137002 A1* | 6/2010 | Agarwal | H04W 4/02 455/456.1 |
| 2010/0186084 A1* | 7/2010 | Hamid | G06F 12/1458 726/19 |
| 2010/0211992 A1* | 8/2010 | Cho | G06F 21/6227 726/3 |
| 2010/0246819 A1 | 9/2010 | Candelore | |
| 2011/0246433 A1* | 10/2011 | Sun | G06F 17/30067 707/698 |
| 2012/0159175 A1 | 6/2012 | Yocom-Piatt et al. | |
| 2012/0203990 A1 | 8/2012 | König | |
| 2012/0212899 A1* | 8/2012 | Michael | H05K 7/1487 361/679.37 |
| 2012/0331088 A1 | 12/2012 | O'Hare et al. | |
| 2013/0097246 A1 | 4/2013 | Zifroni et al. | |
| 2013/0275386 A1* | 10/2013 | Shin | G06F 21/6209 707/667 |
| 2013/0346793 A1 | 12/2013 | Flynn et al. | |
| 2014/0136832 A1 | 5/2014 | Klum | |
| 2014/0143221 A1* | 5/2014 | Hoffmeister | G06F 17/30368 707/705 |
| 2014/0325233 A1* | 10/2014 | Carlson | G06F 21/16 713/176 |
| 2016/0012063 A1 | 1/2016 | Klum | |
| 2016/0071605 A1* | 3/2016 | Moschiano | G11C 16/26 365/185.12 |

\* cited by examiner

SECURED DATA STORAGE ON A HARD DRIVE

FIELD

This disclosure relates to protecting and securing electronically stored data.

BACKGROUND

It is becoming increasingly important to protect electronically stored data from unauthorized accessed. Unauthorized access can include hacking by outsiders, access to the data by insiders not authorized to access the data, and other situations.

In addition, with the ever growing amounts of data, more efficient storage of the electronic data to be secured is desirable.

SUMMARY

Systems and methods of secured electronic data storage on a hard drive are described. A computer system that incorporates the hard drive includes a shrink, shred, and data randomization algorithm built into the read/write function of the computer system for the purposes of securing any data that is saved onto the hard drive. Data to be stored on the hard drive is processed using the algorithm which shrinks, shreds, and randomly distributes the data into multiple partitions of storage on a single data storage device and/or randomly distributes the data into different data storage devices of the hard drive. An electronic log of where the data is distributed is kept in electronic data storage, either on the computer system or separate from the computer system, that allows the data on the hard drive to be retrieved, reassembled, decompressed, and if necessary decrypted, upon receipt of a read/access request.

In one embodiment, any data that is stored on the hard drive can only be accessed by a user (i.e. read access) if they provide "physical" proof of their identity through one or more forms of physical-based authentication that proves the user's physical identification. Physical-based authentication can also be used before allowing a user to store data (i.e. write access) on the hard drive. A log of the user's read and/or write access and requests can be kept for security purposes.

The shrink, shred, and data randomization algorithm can be stored anywhere in the computer system that is part of the data read/write function, for example in suitable permanent or non-volatile storage such as on an ASIC chip on the hard drive itself, or in permanent or non-volatile storage that is separate from the hard drive.

In another embodiment, in addition to the shrink, shred and data randomization functions of the algorithm, the data can also be encrypted before and/or after either or both of the shrink and shred functions.

In another embodiment, the data shredding is randomized.

DETAILED DESCRIPTION

Systems and methods of secured electronic data storage on a hard drive are described further below. A computer system that incorporates the hard drive includes a shrink, shred, and data randomization algorithm built into the read/write function of the computer system for the purposes of securing any data that is saved onto the hard drive. Data to be stored on the hard drive is processed by the algorithm which shrinks, shreds, and randomly distributes the data into multiple partitions of storage on a single data storage device and/or randomly distributes the data into different data storage devices of the hard drive.

The hard drive is local to the computer system in that the hard drive, during writing/reading of data to/from the hard drive by the computer system, is in relatively close proximity to the computer system. The hard drive can be physically built or integrated into and possibly removable from the computer system, physically attached to but detachable from the computer system (for example in the case of an external hard drive), or connected to the computer system by a local area network (for example in the case of networked attached storage (NAS)).

As used herein, a hard drive as used herein is considered to encompass any permanent or non-volatile storage mechanism that has separate and distinct storage locations in which segments of data (discussed below) to be stored can be saved. In one embodiment, the storage locations can be part of a single storage mechanism, for example separate drive partitions on a storage disk. In another embodiment, the storage locations can be separate storage mechanisms, for example separate storage disks. In another embodiment, the storage locations can be separate folders at a storage location (for example, separate folders in NAS). In another embodiment, a combination of different types of storage locations can be used. Examples of hard drives encompassed herein include, but are not limited to, a hard disk drive (HDD), a solid-state drive (SSD), a solid state hybrid drive (SSHD), an external hard drive, a USB flash drive, NAS, and other drives that can functionally replace or have similar functions to the preceding devices.

A computer system as described herein includes, but is not limited to, a personal computer, a mainframe computer, a server computer, a laptop computer, a notebook computer, a tablet computer, or a mobile phone. Laptop computers, notebook computers, tablet computers and mobile phones may also be collectively referred to herein as mobile devices, which are generally considered portable, have a rechargeable battery for providing power to the mobile device, which have some form of built-in or integral user input functionality such as a keyboard or touchscreen, and which have a display screen.

The data to be saved on the hard drive can be static data or dynamic data. Static data is data that does not typically or regularly change, but could change. Dynamic data is data that does typically or regularly change. The data can be saved for any reason including, but not limited to, as part of a data backup, as part of a general data save during regular use of the computer system, and the like. The data to be saved can originate from any source, including a source that is external to the computer system, the data can originate from the hard drive which data is then changed in some manner and resaved on the hard drive, the data can be newly created on the computer system and then saved, and the like.

Figure 1:
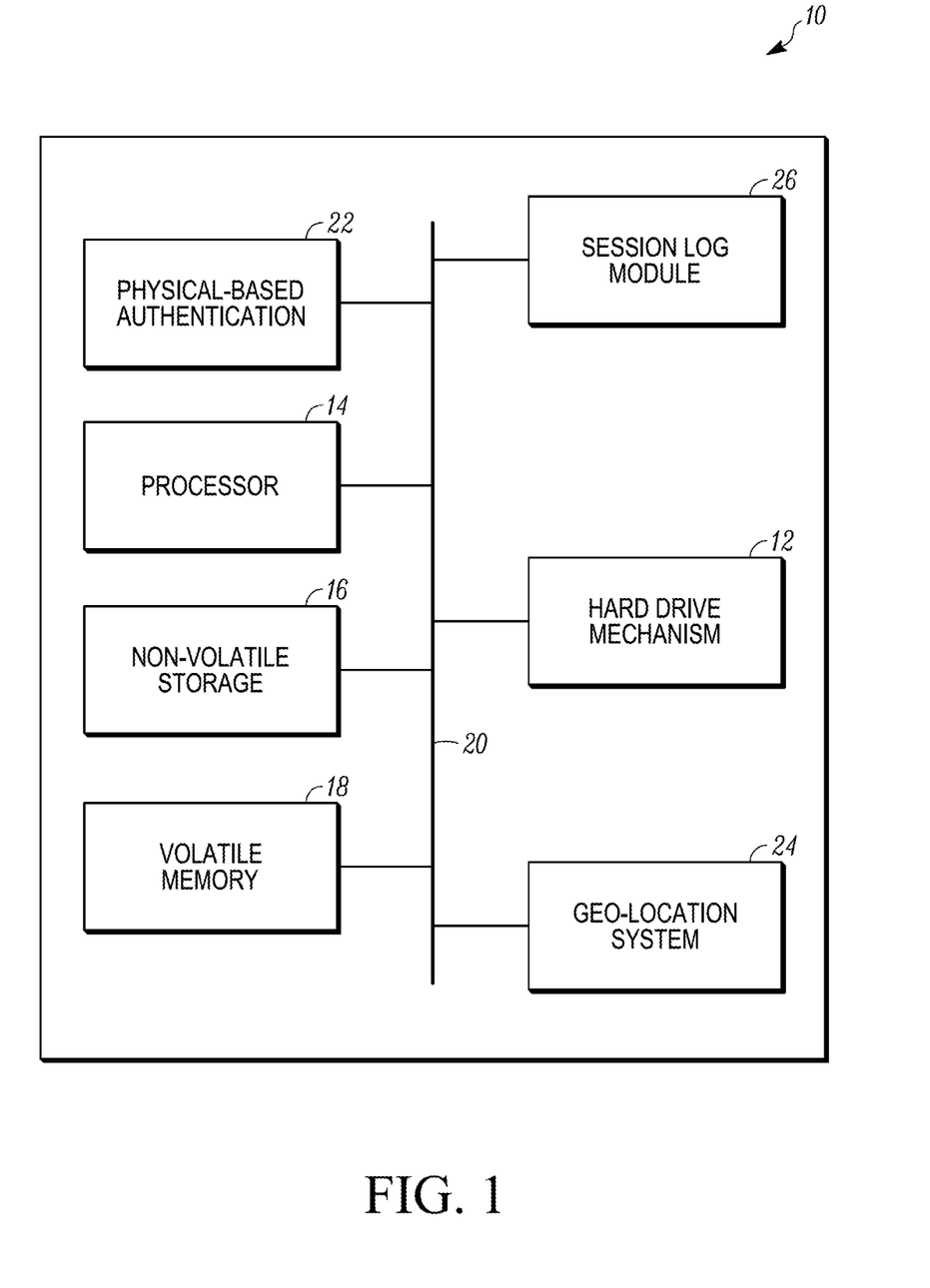
FIG. 1 schematically illustrates a computer system with secured electronic data storage on a hard drive as described herein.

With reference to FIG. 1, a computer system 10 with secured electronic data storage on a hard drive as described herein is illustrated. In this embodiment, the computer system 10 includes a hard drive mechanism 12 suitably connected thereto via a suitable data input and data output, such as a bus 20. The computer system 10 also includes one or more processors 14, for example one or more CPU's and/or one or more GPU's, for processing data and implementing program instructions, one or more non-volatile storage devices 16 and one or more volatile memory devices 18 connected to the processor(s) 14 via the bus 20. The computer system 10 can also include a physical-based authentication system 22, a geo-location system 24, and a session log module 26 each of which is discussed further below.

In one embodiment, the computer system 10 includes a housing, such as a case, and the hard drive mechanism 12, the processor 14, and the non-volatile data storage 16 are disposed in the housing. The other elements illustrated in FIG. 1 can also be disposed in the same housing.

The non-volatile storage 16 stores a shrink, shred, and data randomization algorithm discussed further below. The non-volatile storage 16 is built into the read/write function of the computer system 10 for the purposes of securing any data that is saved onto the hard drive mechanism 12.

Figure 2:
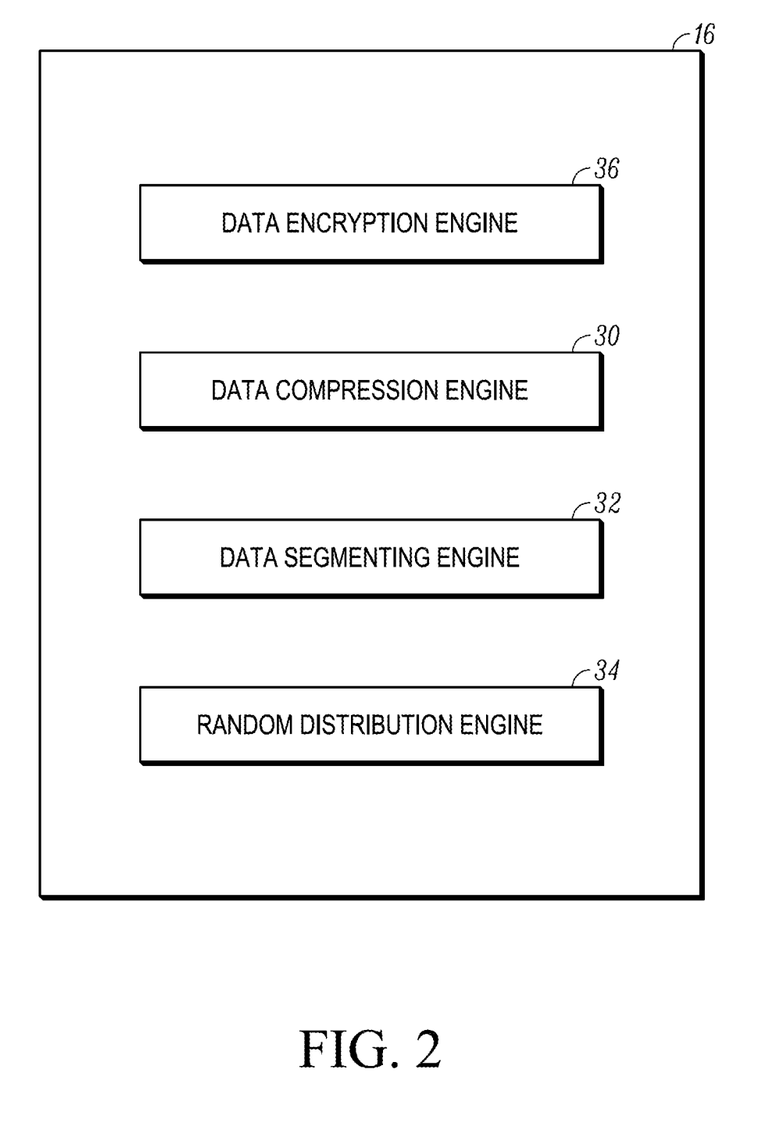
FIG. 2 schematically illustrates an algorithm for achieving secured electronic data storage as described herein that is stored in non-volatile storage of the computer system.

With reference to FIG. 2, the shrink, shred, and data randomization algorithm saved in the non-volatile storage 16 includes a data compression engine 30, a data segmenting engine 32, a data segment random distribution engine 34, and in some embodiments, a data encryption engine 36. The data compression engine 30 is configured to compress data that is to be stored on the hard drive mechanism 12 to reduce the size of the data, as well as decompress data read from the hard drive mechanism 12. The data segmenting engine 32 is configured to shred, divide or segment the data to be stored into a plurality of segments of data, as well as reassemble the data segments from the hard drive mechanism 12. The data segment random distribution engine 34 is configured to randomly distribute the data segments to different storage locations on the hard drive mechanism 12, as well as retrieve the data segments from the storage locations. The data encryption engine 36, if used, encrypts the data to be stored on the hard drive mechanism 12, as well as decrypt the data retrieved from the hard drive mechanism 12.

During a data write process, the data compression by the data compression engine 30, data segmenting by the data segmenting engine 32, and data encryption (if any) by the data encryption engine 36 can occur in any order prior to distribution of the data segments by the distribution engine 34. For example, compression can occur first followed by data segmenting followed by data encryption (if used). In another embodiment, data segmenting occurs first, followed by data compression followed by data encryption (if used). Other processing sequences are possible and are considered to be encompassed herein.

The data compression engine 30 is configured to compress or reduce the size of the data to be stored on the hard drive mechanism 12 using any compression technique. One example of a suitable compression technique that can be used is described in U.S. application Ser. No. 14/797,824 filed on Jul. 13, 2015 and titled Data Conversion Method, which is incorporated herein by reference in its entirety. However, many other known data compression technologies and techniques could be used. Any data compression technique that reduces the size of the data can be used. The data compression engine 30 is also configured to decompress data that is retrieved from the hard drive mechanism 12 in a read process.

The data segmenting engine 32 is configured to shred, split, divide, segment, etc. the data to be stored on the hard drive mechanism 12 into a plurality of segments or pieces. One example of segmenting data is described in U.S. Patent Application Publication 2014/0136832 published on May 15, 2014 and titled Systems and Methods of Transmitting Data, which is incorporated herein by reference in its entirety. The data segmenting engine 32 is also configured to reassemble the data segments during a read process.

As described in U.S. Patent Application Publication 2014/0136832, in general, the larger the number of segments of data, the more secure the data will be. In one embodiment, the data can be divided into at least two segments with no upper limit on the number of data segments. In another embodiment, the data can be divided into at least three segments with no upper limit on the number of data segments.

In one embodiment, the data is divided into X generally equal size segments. For example, if the data to be saved to the hard drive mechanism 12 is 10 MB in size, the data can be divided into five equal segments of 2 MB each. As an example, assume that the following represents 10 MB of data that is to be saved to the hard drive mechanism:

ABCDE, with A, B, C, D, and E each equaling 2 MB of data. The data can be divided into five equal size segments A, B, C, D and E each of which is saved in a separate storage location on the hard drive mechanism 12.

In another embodiment, the data segments can be divided into differently sized segments. To illustrate based on the example above, one segment can be formed by A and B (4 MB), with C, D, and E forming 2 MB data segments.

In still another embodiment, the data segments can be randomly formed. To illustrate based on the example above, assume A includes A', A", B includes B', B", C includes C', C", D includes D', D" and E includes E', E". The data segments can be formed by randomly combining portions of the data to form the segments. For example, the following random segments can be created:

1. A", C'
2. B', C", D"
3. A', D'
4. E'
5. B" E"

Many other data segment formations and combinations are possible. Regardless of how the data segments are formed, the computer system 10 maintains a report on the original ordering of the data, and the composition of the data segments created, to permit the data segments to be reassembled into proper order during a read process to recreate the original data. The report can be saved in the non-volatile storage 16 and/or in non-volatile storage of a computer system remote from, but capable of communicating with, the computer system 10.

The data encryption engine 36 (if used) can be any suitable encryption technique known in the art, for example 128 bit or 256 bit encryption. The data encryption can occur on the data before the data is segmented by the segmenting engine 32, on the data segments after the data is segmented, or both depending upon the level of security desired. The data encryption engine 36 is also configured to decrypt the data which is well known in the art.

Once the data is compressed and segmented (and optionally encrypted), the data segments are then randomly distributed by the random distribution engine 34 to diverse storage locations on the hard drive mechanism 12. The data segments are randomly distributed and saved in different locations to make it difficult for unauthorized access to the stored data.

A log of where each data segment is saved in the hard drive mechanism 12 is created and saved in suitable non-volatile storage accessible by the computer mechanism 10, for example in the non-volatile storage 16 and/or in non-volatile storage of a computer system remote from, but capable of communicating with, the computer system 10, to allow later retrieval and subsequent reassembly of the data segments into the original data. U.S. Patent Application Publication 2014/0136832, which is incorporated herein by reference in its entirety, provides further information on retrieving and reassembling data segments from diverse storage locations.

The hard drive hard mechanism 12 has separate and distinct storage locations in which the data segments can be saved. For example, with reference to FIG. 3, in one embodiment the hard drive mechanism 12 can comprise a rotatable disk or platter that is logically partitioned in known manner into a plurality of partitions 40a, 40b, . . . 40n. Any number of partitions can be used as long as they are capable of storing the data segments. In this example, the data segments are randomly distributed to and saved in the partitions 40a,b, . . . n.

Figure 3:
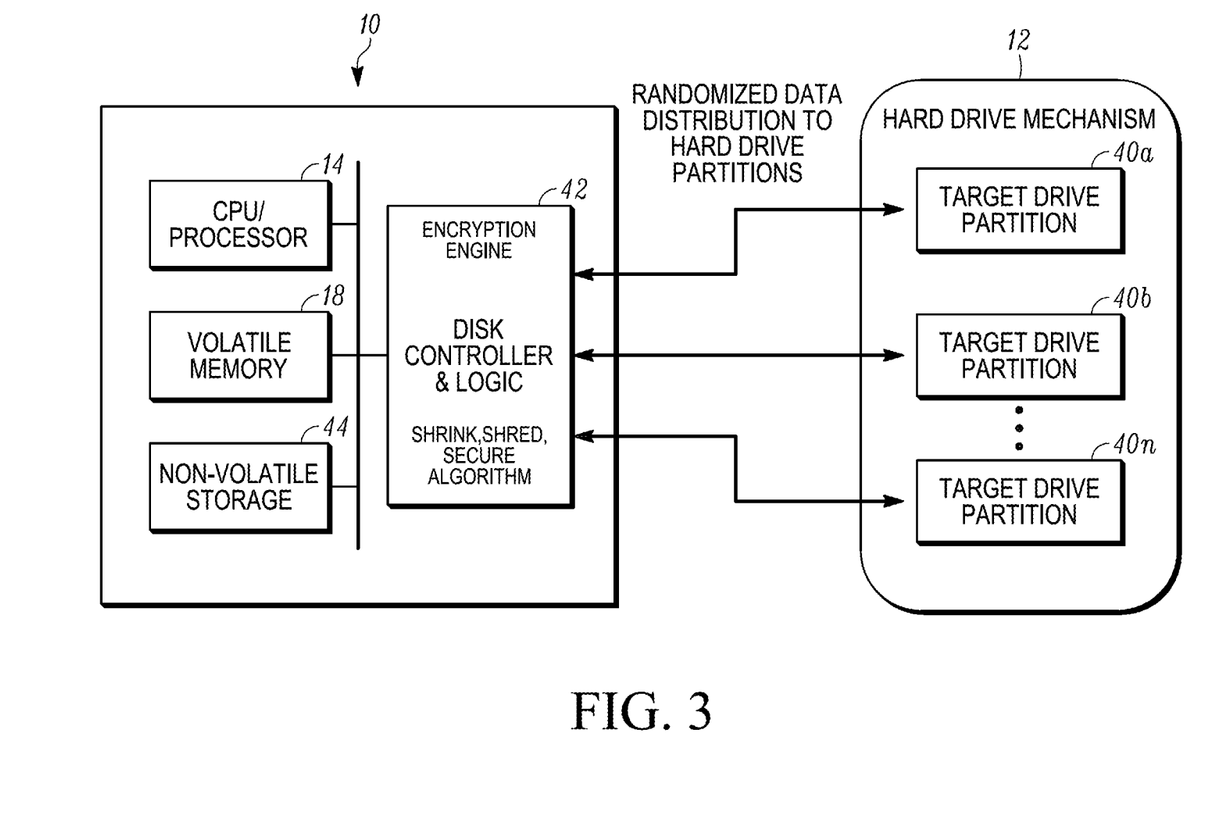
FIG. 3 schematically illustrates one embodiment of secured electronic data storage on a hard drive.

In the example illustrated in FIG. 3, the computer system 10 includes non-volatile storage 42 that stores the data compression engine, the data segmenting engine, the random distribution engine and the data encryption engine, as well as contains the disk logic and controller that controls operation of the hard drive mechanism including the writing of data to, and reading of data from, the partitions 40a, b . . . n. The computer system 10 can also include additional non-volatile storage 44 that stores programs such as the operating system. The secured, electronic, hard drive data storage described herein can work with any operating system including, but not limited to, Windows, Linux, Unix, Android, iOS, BSD, OS X, QNX, Windows Phone, or IBM z/OS.

Figure 4:
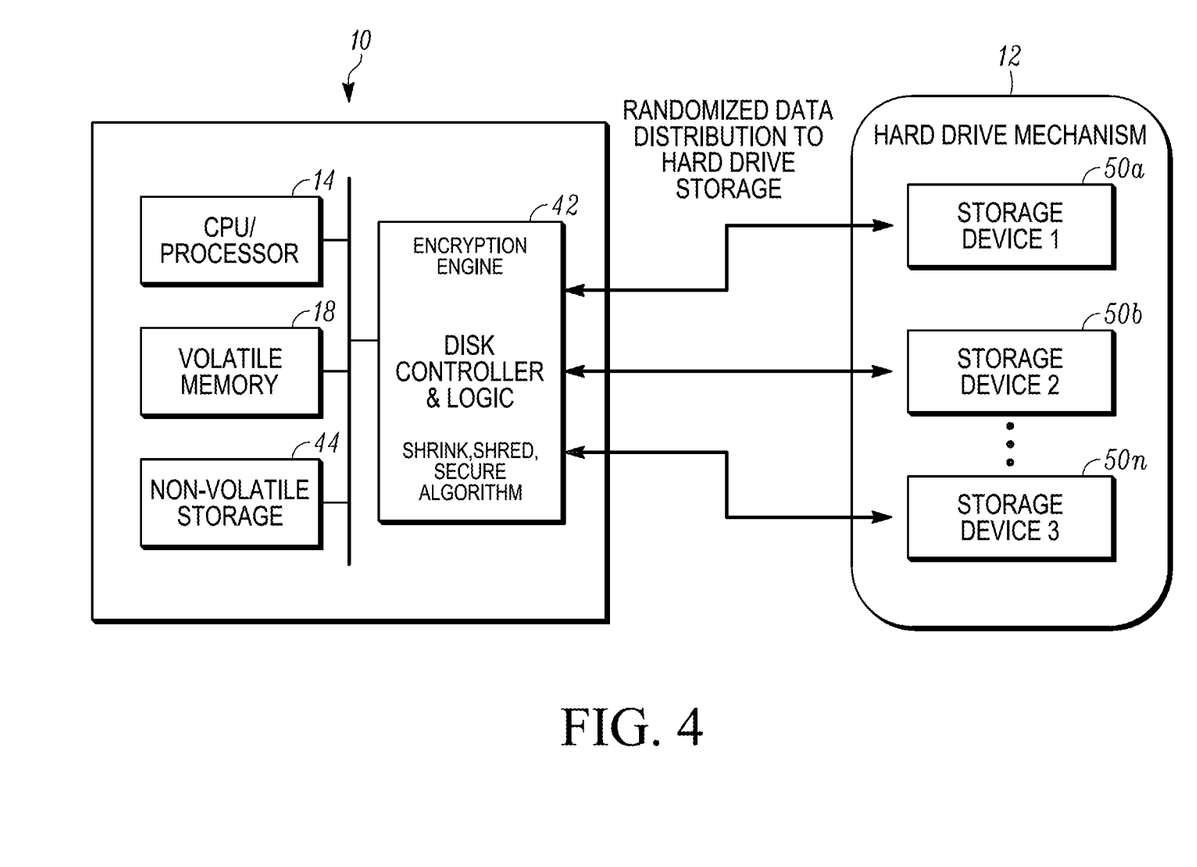
FIG. 4 schematically illustrates another embodiment of secured electronic data storage on a hard drive.

FIG. 4 illustrates another example of the hard drive mechanism 12 where, instead of using a single partitioned disk as in FIG. 3, the hard drive mechanism 12 includes a plurality of storage devices in the form of rotatable disks 50a, 50b, . . . 50n. Any number of disks can be used. One or more of the disks can be partitioned as discussed above for FIG. 3. In this embodiment, the data segments are randomly distributed to and saved in the disks 50a,b, . . . n. In one embodiment, the data segments can be stored on separate disks 50a, b, . . . n. In another embodiment, the data segments can be stored on separate disks, and if the disks are partitioned, some disks may store more than one data segment in the separate partitions thereof.

Figure 5:
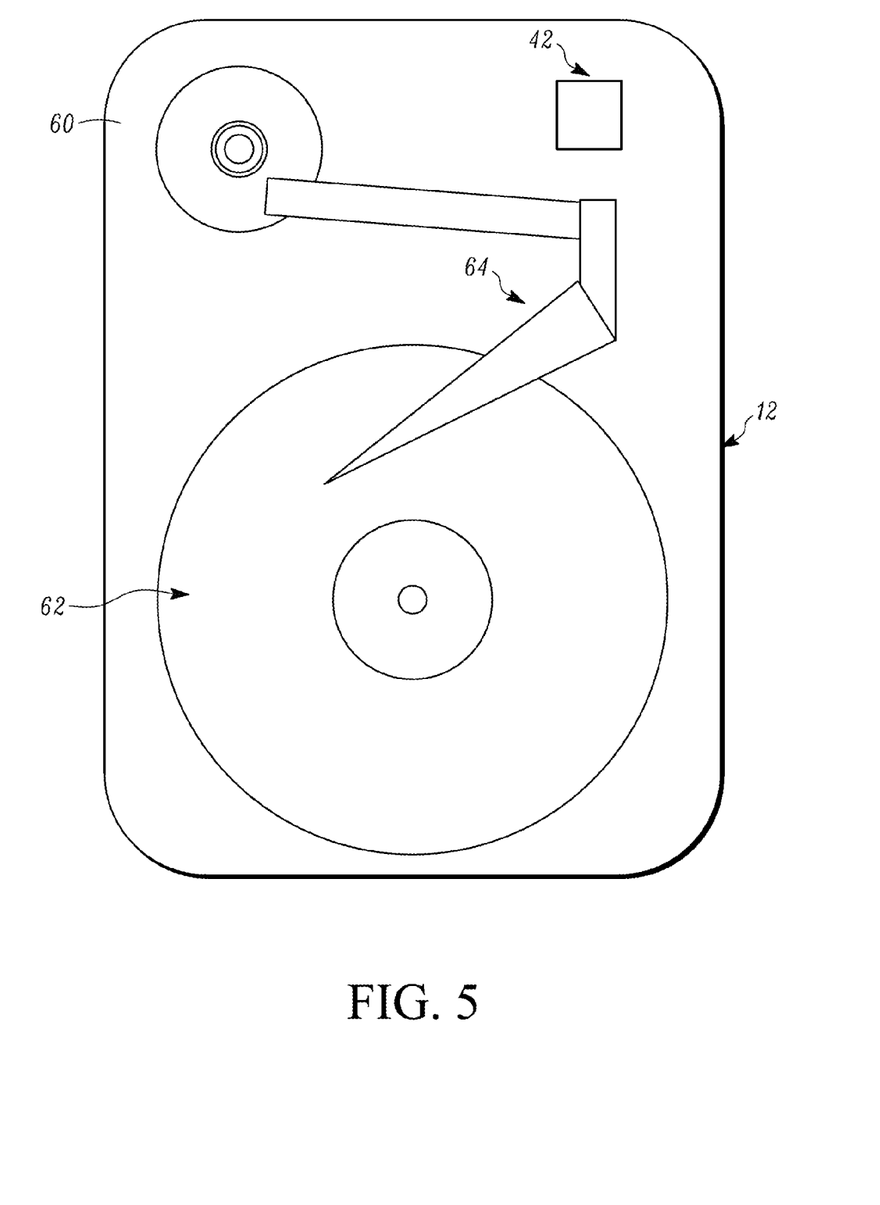
FIG. 5 schematically illustrates another embodiment of secured electronic data storage on a hard drive with the algorithm stored in non-volatile storage on the hard drive.

FIG. 5 illustrates one embodiment of a construction of the hard drive mechanism 12 including a chassis 60 rotatably supporting thereon at least one rotatable storage disk 62, and a conventional read/write mechanism 64 associated with each storage disk 62 for writing data to and reading data from the disk 62. In this example, the non-volatile storage 42 containing the data compression engine, the data segmenting engine, the random distribution engine, the data encryption engine, and the disk logic and controller that controls read/write operations of the hard drive mechanism 12 is mounted on the hard drive mechanism 12 itself, for example on the chassis 60.

Returning to FIG. 1, the physical-based authentication system 22 is configured to authenticate the individual wishing to write data to and/or read data from the hard drive mechanism 12. Examples of physical authentication that can be used include one or more of biometric (for example fingerprint, palm print, iris, retina, facial recognition, and the like), voice, or haptic feedback authentication. The implementation and operation of physical authentication techniques is well known in the art. In one embodiment, the physical authentication can occur once when the user first logs onto the computer system 10, and thereafter all read/write activities occur without further physical authentication. In another, the physical authentication occurs each time that a user attempts to read data from and/or write to the hard drive mechanism.

The geo-location system 24 is optional and keeps track of the physical location of the computer system 10 and optionally time information. The geo-location system 24 can be, for example, a Global Positioning System-based (GPS-based) system. In one embodiment, the geo-location system 24 can be used to prevent read/write access to the hard drive mechanism 12 if the computer system 10 is not in its expected location. In another embodiment, the geo-location system 24 can used as part of read/write tracking to indicate the location (and in some embodiments the exact time) of the computer system 10 during each read and/or write operation from and to the hard drive mechanism 12.

The session log module 26 keeps data files on each read and/or write operation on the hard drive mechanism 12. The session log data can include, but is not limited to, information on the date and time of access, the identity of the person accessing the data, the location of the computer system at the time of access, the data that was written to and/or read from the hard drive mechanism, the original data, and other data. The session log module 26 can be stored anywhere on the computer system 10, for example in non-volatile storage such as the storage 16, 42, 44. In another embodiment, the session log data on each read and/or write operation can be pushed out of the computer system 10 to a second computer system where the session log data is stored remote from the computer system 10. This would be useful in a number of situations, including allowing management to audit and track individual user's access to data on the hard drive mechanism 12.

Figure 6:
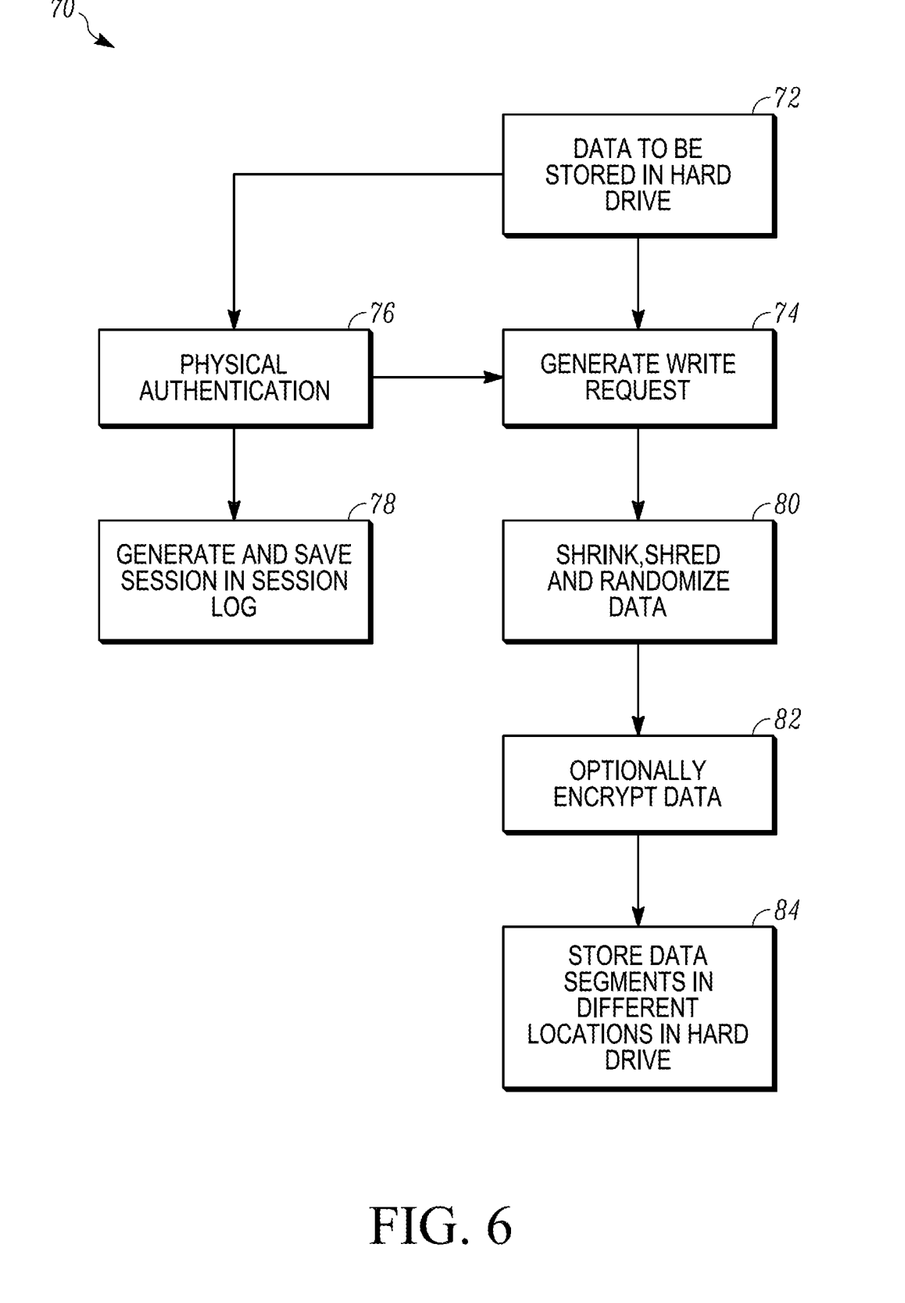
FIG. 6 illustrates an example of a method of writing data to a hard drive as described herein.

With reference to FIG. 6, one example of a process 70 of writing data to the hard drive for storage on the hard drive 12 is illustrated. The process 70 begins at 72 by generating, gathering or otherwise obtaining the data that is to be stored on the hard drive. At 74, a write request is generated in standard manner for storing the data on the hard drive. Prior to or after generation of the write request, physical authentication can be used at 76 to authenticate the user before actually storing the data on the hard drive. At 78, a session log can be generated and saved in the session log module 26. The session log can be generated and saved at other times in the process 70, for example after the data segments are stored in the hard drive.

Assuming the user is authenticated, the shrink, shred, and randomly distribution algorithm is applied to the data at 80 to shrink, shred and determine where the data segments will be randomly distributed in the hard drive. Optionally, the data and/or the data segments can be encrypted at 82.

At 84, the data segments are then saved to the different, random locations on the hard drive for storage.

Figure 7:
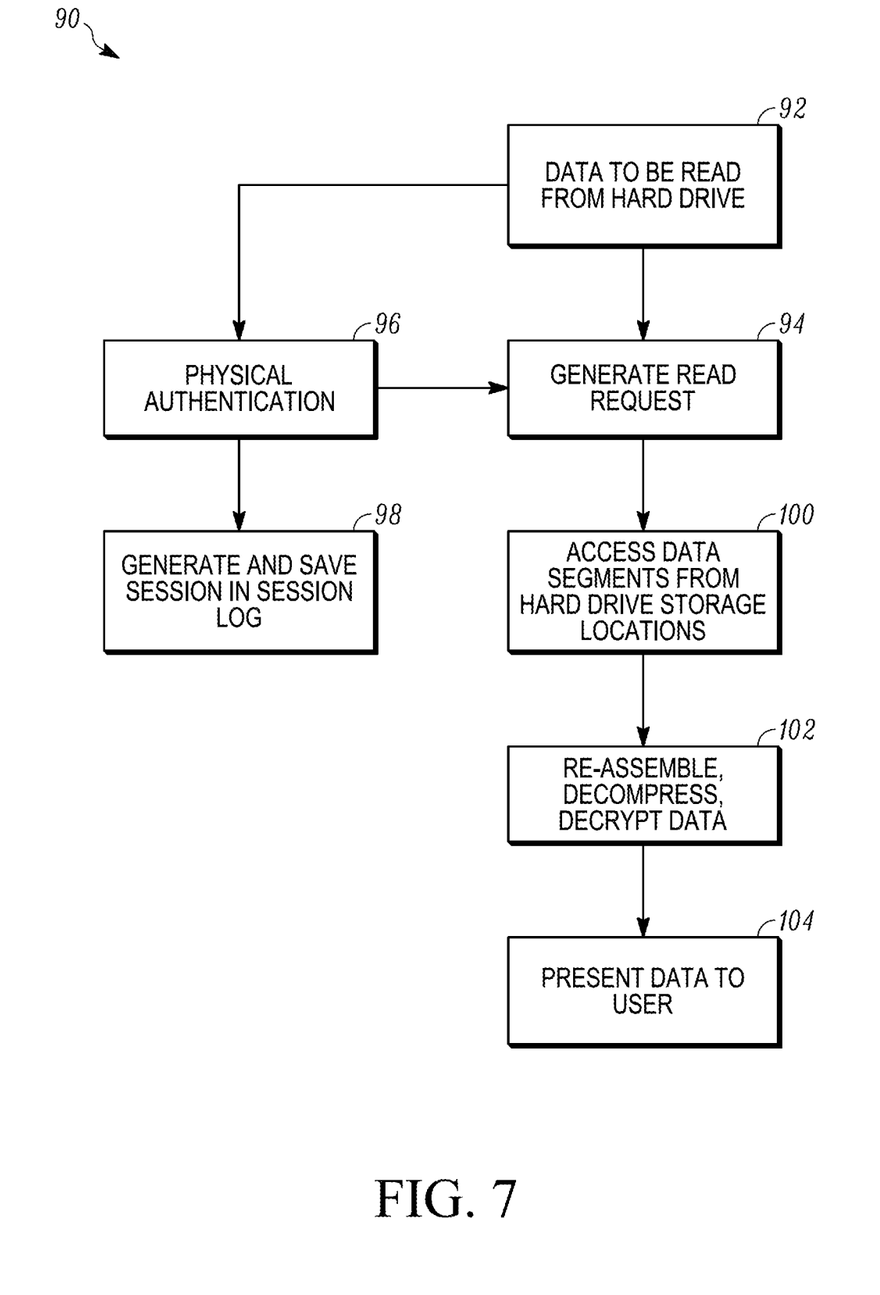
FIG. 7 illustrates an example of a method of reading data from a hard drive as described herein.

FIG. 7 illustrates one example of a process 90 of reading or accessing data from the hard drive. The process 90 begins at 92 by determining which data is to be read from the hard drive. At 94, a read request is generated in standard manner for reading the data from the hard drive. The read request can include information on the various storage locations of the data segments forming the requested data, which storage locations are known by the computer system 10. Prior to or after generation of the read request, physical authentication can be used at 96 to authenticate the user before actually reading the data from the hard drive. At 98, a session log can be generated and saved in the session log module 26. The session log can be generated and saved at other times in the process 90, for example after the data segments are retrieved from the hard drive.

Assuming the user is authenticated, the data segments are accessed and obtained from their various hard drive storage locations 100. The data segments are then reassembled, decompressed and if necessary decrypted at 102. At 104, the data segments are then presented to the user, for example for viewing, working with the data, saving the data to another location, and the like.

All of the embodiments described herein, along with their individual features, can be used together in any combinations thereof.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A computer system, comprising:
   a hard drive mechanism having a data input and a data output, and multiple storage locations each of which can store data;
   a data processor operatively connected to the data input and the data output for processing data; and
   non-volatile data storage that is operatively connected to the processor, the non-volatile data storage is provided with program instructions to compress data that is to be stored in the multiple storage locations, divide the data that is to be stored into a plurality of data segments, and randomly distribute each of the plurality of data segments to a storage location of the multiple storage locations that are available in the hard drive mechanism for storage of the data segments, wherein for each of the plurality of data segments, a data segment is stored in a single storage location among the multiple storage locations that are available in the hard drive mechanism.

2. The computer system of claim 1, wherein the hard drive mechanism comprises a plurality of data storage drives that form the multiple storage locations, and the program instructions on the non-volatile data storage randomly distributes the data segments to at least two of the data storage drives for storage of the data segments.

3. The computer system of claim 2, wherein the data storage drives are rotatable data storage disks.

4. The computer system of claim 1, wherein the hard drive mechanism is a hard disk drive, a solid state drive, a solid state hybrid drive, an external hard drive, a USB flash drive, and/or networked attached storage.

5. The computer system of claim 1, wherein the hard drive mechanism comprises a data storage drive that is partitioned into a plurality of partitions that form the multiple storage locations, and the program instructions on the non-volatile data storage randomly distribute the data segments to the plurality of partitions for storage of the data segments.

6. The computer system of claim 1, wherein the program instructions randomly divide the data to be stored into the plurality of data segments.

7. The computer system of claim 1, wherein the hard drive mechanism includes a chassis; and the multiple storage locations, the non-volatile data storage and a read/write device are mounted on the chassis.

8. The computer system of claim 1, wherein the program instructions encrypt the data that is to be stored.

9. The computer system of claim 1, further comprising a physical-based authentication system connected to the processor that controls access to the data in the multiple storage locations using at least one physical-based authentication technique.

10. The computer system of claim 9, wherein the physical-based authentication technique comprises biometric, voice or haptic feedback authentication.

11. The computer system of claim 9, further comprising a geo-location system that is configured to provide a current geographic location of the computer system.

12. The computer system of claim 9, further comprising a session log module that creates a log file of each user access to data written to or read from the hard drive mechanism, and each log file is stored in non-volatile data storage.

13. The computer system of claim 1, further including an operating system, and the operating system comprises Windows, Linux, Unix, Android, iOS, BSD, OS X, QNX, Windows Phone, or IBM z/OS.

14. The computer system of claim 1, further including a housing, and the hard drive mechanism, the data processor and the non-volatile data storage are disposed in the housing.

15. The computer system of claim 1, wherein the computer system comprises a personal computer, a mainframe computer, a server, a laptop computer, a notebook computer, a tablet computer, or a mobile phone.

16. The computer system of claim 1, wherein the multiple storage locations comprise one or more of:
   a plurality of partitions on a data storage drive;
   a plurality of data storage drives; and
   a plurality of folders of a storage device.

17. A method of secured data storage on a hard drive mechanism having multiple storage locations, comprising:
   receiving data, for processing by a data processor, that is to be stored on the hard drive mechanism;
   the data processor compressing the data, randomly divides the data into a plurality of data segments, and randomly determines the locations of the multiple storage locations that are available in the hard drive mechanism for each of the data segments to be stored in the multiple storage locations of the hard drive mechanism; and
   storing each of the data segments in the determined location of the multiple storage locations,
   wherein for each of the plurality of data segments, a data segment is stored in a single storage location among the multiple storage locations that are available in the hard drive mechanism.

18. The method of claim 17, prior to storing the data segments, performing physical authentication of a user that requests that the data be stored on the hard drive mechanism, and storing the data segments in the determined locations of the multiple storage locations only if the user passes the physical authentication.

19. The method of claim 17, further comprising encrypting the data that is to be stored on the hard drive mechanism.

20. The method of claim 17, wherein the hard drive mechanism comprises one or more of the following:
   a plurality of data storage drives that form the multiple storage locations;
   a data storage drive that is partitioned into a plurality of partitions that form the multiple storage locations;
   a storage device with a plurality of folders that form the multiple storage locations.

21. A computer system, comprising:
   a hard drive mechanism having a data input and a data output and also including a chassis supporting:
      a storage drive having a plurality of storage locations each of which can store data,
      a controller that controls read/write operations on the storage drive, the controller including a data processor operatively connected to the data input and the data output for processing data, and
      a non-volatile storage connected to the processor, the non-volatile storage storing a data compression engine with program instructions to compress data that is to be stored in the plurality of storage locations, a data segmenting engine with program instructions to divide the data that is to be stored into a plurality of data segments, and a random distribution engine with program instructions to randomly distribute each of the plurality of data segments to one storage location of the plurality of storage locations that are available in the hard drive mechanism for storage of the data segments,
      wherein for each of the plurality of data segments, a data segment is stored in a single storage location among the multiple storage locations that are available in the hard drive mechanism.

22. The computer system of claim 21, wherein the non-volatile storage storing a data encryption engine with program instructions to encrypt data to be stored on the hard drive mechanism.

23. The computer system of claim 21, further comprising a physical-based authentication system connected to the processor that controls access to the data in the plurality of storage locations using at least one physical-based authentication technique, wherein the physical-based authentication technique comprises biometric, voice or haptic feedback authentication.

* * * * *